UNITED STATES PATENT OFFICE.

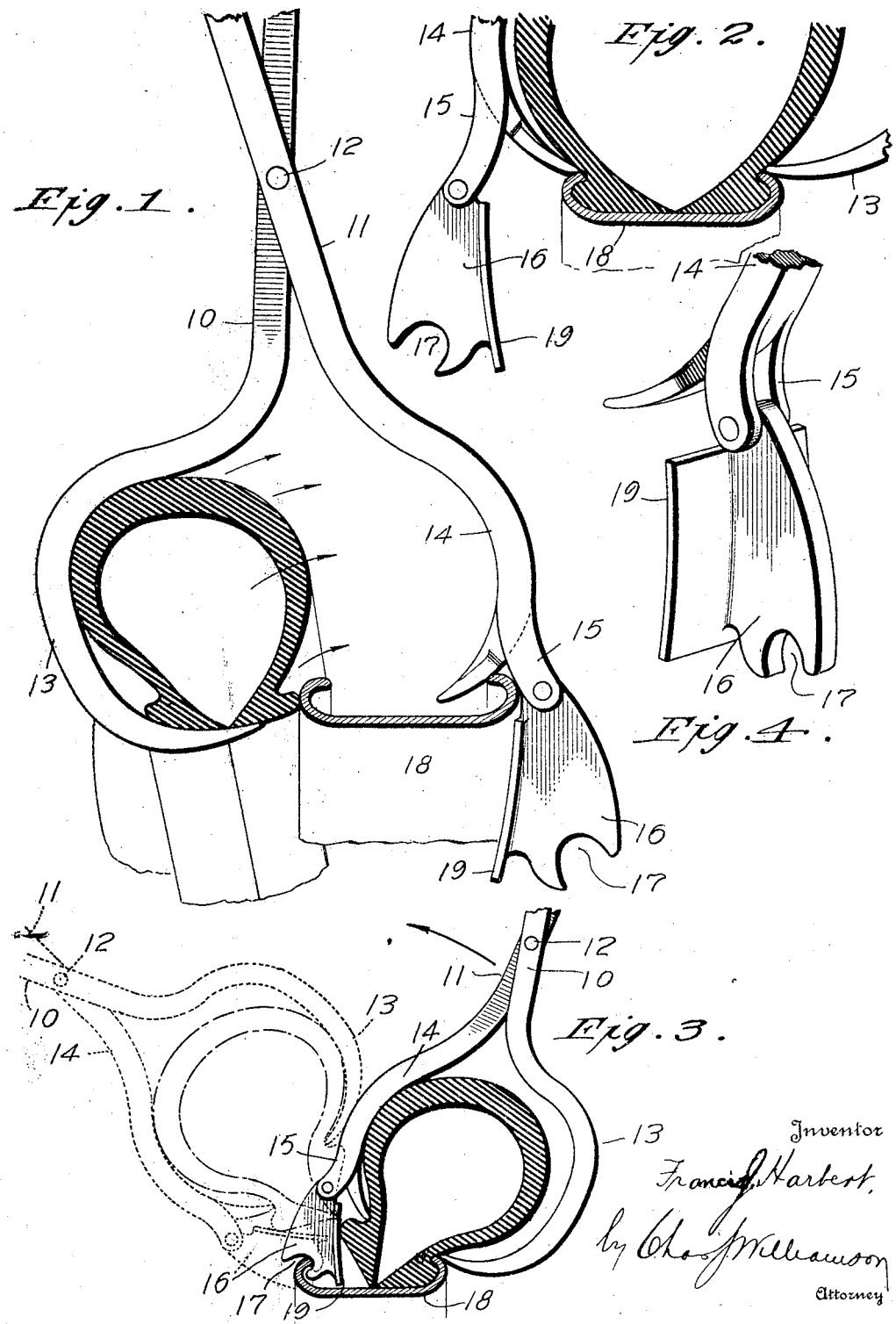

FRANCIS J. HARBERT, OF TWIN FALLS, IDAHO, ASSIGNOR OF ONE-HALF TO WILLIS T. HARBERT, OF TWIN FALLS, IDAHO.

AUTOMOBILE-TIRE TOOL.

1,378,787. Specification of Letters Patent. Patented May 17, 1921.

Application filed February 17, 1921. Serial No. 445,707.

*To all whom it may concern:*

Be it known that I, FRANCIS J. HARBERT, residing at Twin Falls, in the county of Twin Falls and State of Idaho, a citizen of the United States, have invented certain new and useful Improvements in Automobile-Tire Tools, of which the following is a specification.

The object of my invention, stated in a general way, is to provide a tool for the application and removal of pneumatic tires which will reduce the labor and time required to the minimum, and eliminate the discomfort and annoyance ordinarily incident to such operations, and to this end, my invention consists in a tool having the construction described by or included within the terms or scope of the appended claims.

In the annexed drawings—

Figure 1 is a view in side elevation, of a tool embodying my invention, shown as employed in a tire applying operation;

Fig. 2 is a similar view showing it at the beginning of a tire removing operation;

Fig. 3 is a like view showing the tire-removing operation at an intermediate stage; the dotted lines showing the position of parts when the tire is completely disengaged from the rim;

Fig. 4 is a detail view in perspective of the dog and adjacent portion of the jaw to which it is attached.

The tool of my invention has a tong-like form, it comprising two straight handles, 10 and 11, respectively, which at one end terminate in opposing curved jaws, that, by the motion of the handles on the pivot 12, are movable toward each other, one jaw, 13, being curved through an arc of more than a semi-circle, and the other jaw, 14, being less than a semi-circle and both jaws ending in a somewhat flattened finger fit to engage the tire bead in the crease adjacent thereto. Pivoted to an outward extension of the jaw 14 in the form of a slotted lug, 15, is a dog, 16, that at its free end has a notch, 17, shaped to engage the curved bead-engaging flange or edge, of the rim, 18, so that it may rock thereon as a fulcrum for the tool, when used as a lever, as hereafter explained, and having on the side next the jaw finger, a substantially flat, oblong plate, 19, of a length sufficient to reach a substantial distance beyond such finger and form a support for the tire bead under the conditions of use hereafter explained. The external peripheral surface of the jaw 13, especially that adjacent the finger thereof, must be free from any off-sets or projections, so that in manipulating the tool, such jaw, 13, will not strike against the wheel rim.

The manner of using my tool to apply a tire to the wheel, is shown in Fig. 1, the wheel being on its axle. The dog-carrying jaw, 14, is placed so that its finger rests upon the edge of the rim 18, with the dog 16, hanging at the side of and in contact with the rim, and the other jaw, 13, opened out to engage the tire at the portion next, but off the rim, the finger of the jaw 13, lying under both tire beads. Then, by a movement of the handles both on their pivot, 12, and on the finger of the jaw, 14, resting on the rim edge, the engaged portion of the tire is pried over the outer edge of the rim and the beads, squeezed together by the engagement of the jaws therewith, dropped into the rim, and the beads then expand into engagement with the rim flanges, the jaws being spread apart, of course, to allow this action. It will be seen that the engagement of the finger of jaw 14 with the rim at the top, and the engagement of the lug 15, with the rim side, prevent the tool slipping in either direction during the tire-applying operation.

The manner of using my tool for removing a tire is shown in Figs. 2 and 3, the wheel being on its axle. The jaws are closed upon the tire, as shown in Fig. 2 with the dog 16, hanging alongside the rim on the outside, and then the tool, as a lever, is rocked inward to the position shown in full lines in Fig. 3, which results in the disengagement of the outer bead from the rim and squeezing it far enough over against the other bead to allow the dog, 16, to drop between the outer bead and the outer edge of the rim, 18, and engage its notch, 17, with the rim edge and its plate 19, with the outer bead, whereupon, the tool being swung outward with the dog as its bearing member against the rim edge, the inner bead is disengaged from the rim, and the tire carried bodily outward over the rim, and freed therefrom, as shown in dotted lines, Fig. 3, the plate, 19, serving as support for the beads during this movement and protecting the inner tube from injury.

What I claim, is:

1. A tire tool comprising a pair of pivoted handles having opposing, curved jaws that terminate in bead-engaging fingers, and a dog pivoted to one of the jaws contiguous to its finger having a rim-engaging portion that forms a rim bearing for the tool, and having a bead-engaging surface that extends a substantial distance beyond the free end of such finger, when the dog lies alongside of the finger, such surface being on a plate of substantial longitudinal and lateral extent.

2. A tire tool comprising a pair of handles having opposing curved jaws that terminate in bead-engaging fingers one of such jaws having a periphery free from projections, and a dog pivoted to an extension of the other one of said jaws said extension being situated to engage the tire rim on the outer side, adjacent to its finger, having a rim-engaging notch in its free end, and a plate that extends a substantial distance beyond the end of the finger, when the dog lies alongside the finger, and forms a bead-engaging member, said plate being adapted to lie between the wheel rim and the adjacent bead in a tire-removing operation and form a direct support for such bead at such time.

In testimony whereof I hereunto affix my signature.

FRANCIS J. HARBERT.